United States Patent [19]

Briddell

[11] Patent Number: 5,200,980
[45] Date of Patent: Apr. 6, 1993

[54] DIGITAL BI PHASE DATA RECOVERY SYSTEM

[75] Inventor: Dennis M. Briddell, Raleigh, N.C.

[73] Assignee: Memorex Telex N.V., Amsterdam, Netherlands

[21] Appl. No.: 743,259

[22] Filed: Aug. 9, 1991

[51] Int. Cl.[5] ............................................. H04L 27/22
[52] U.S. Cl. ........................................ 375/83; 375/55; 375/87; 329/310
[58] Field of Search .................. 375/52, 55, 83, 87; 340/70, 71; 360/42, 43; 329/304, 310

[56] References Cited

U.S. PATENT DOCUMENTS

| | | | |
|---|---|---|---|
| 3,982,195 | 9/1976 | Turner | 329/310 |
| 4,267,595 | 5/1981 | Heinandez | 360/43 |
| 4,805,191 | 2/1989 | Burch et al. | 375/11 |
| 4,866,739 | 9/1989 | Agazzi et al. | 375/106 |
| 4,876,700 | 10/1989 | Grindahl | 375/87 |
| 4,937,840 | 6/1990 | Hotine | 375/53 |
| 5,001,728 | 3/1991 | Fuldner | 375/83 |

Primary Examiner—Curtis Kuntz
Assistant Examiner—Young Tse
Attorney, Agent, or Firm—Head & Johnson

[57] ABSTRACT

A data recovery system for deriving digital data from a bi phase encoded stream wherein signal transition occurs at mid-bit or bit boundary having an edge detector for detecting the occurrence of each fallen edge of a data stream, an edge decoder connected to the detector for determining the time between successive falling edges, a falling edge identifier connected to the edge decoder for determining whether a detected fallen edge occurs on a bit boundary or at a mid-bit, a falling edge memory connected to the falling edge identifier for remembering whether the previous falling edge occurred at a bit boundary or at mid-bit, a data decoder connected to receive input from the falling edge memory and the edge decoder, and having logic for determining the recovered data according to a table in which the data is identified in response to the occurrence at a bit boundary or at mid-bit and a selected spacing between falling edges.

1 Claim, 2 Drawing Sheets

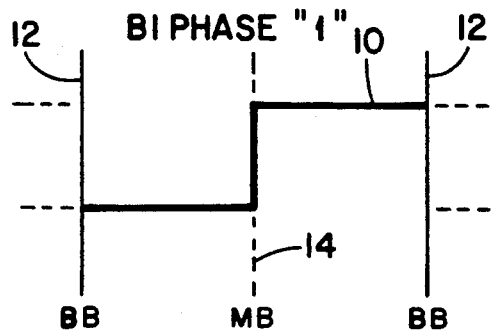
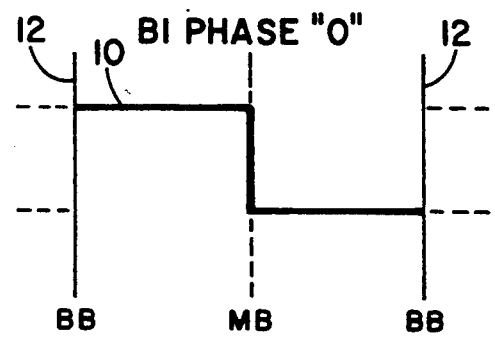
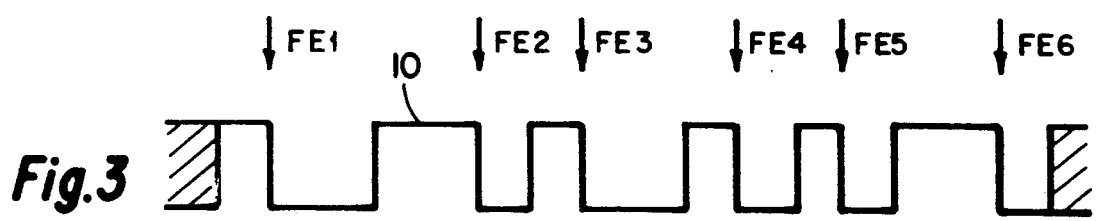
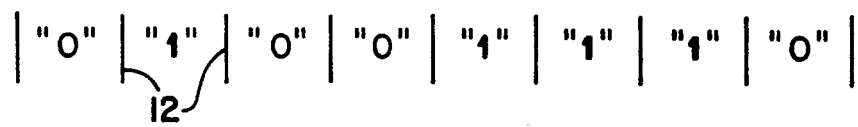
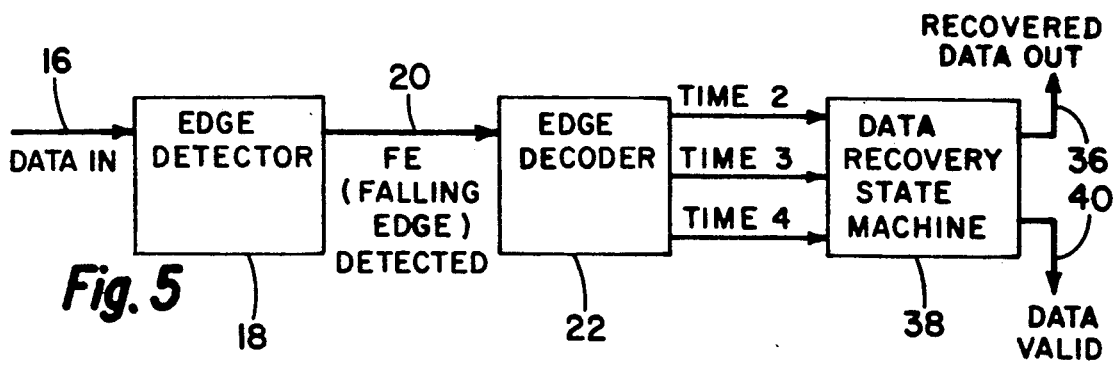

DIGITAL BI PHASE DATA RECOVERY SYSTEM

BACKGROUND AND SUMMARY OF THE INVENTION

In some existing computer systems communication from a control unit to a peripheral device is normally accomplished serially using a bi phase encoded scheme. A protocol is selected to ensure that all bits have a transition at the mid-bit boundary. Heretofore, two methods have been implemented for data recovery, one called "data sampling" and the other termed "analog clock recovery".

Analog clock recovery energizes a tank circuit on all falling edges of the inbound transmission. The tank circuit is precision tuned to a frequency 8 times that of the transmitter, thus the transmission clock is recovered in "real time" and the inbound data can be synchronized to this clock. This system works satisfactorily except phase distortion can cause the recovered data to have skewed bit cells and the circuit presents an invariable impedance which itself contributes to distortion.

Digital sampling recovers data by measuring the value of the received data at regular intervals and then follows by decoding where each bit cell is located. The inherent problem of this system is that cells and bit time relationships must be determined in parallel.

This disclosure provides for digital data recovery that increases the quality and reliability of recovered data. These advantages are achieved since the received data is not sampled. Instead, data is decoded by measuring the time between consecutive falling edges of a data stream relative to a local time base. The time measurement is then used with a set of rules, or tables, to determine whether the falling edges occured on bit boundaries or mid-bit and further logic reveals the encoded data. The method of this disclosure allows liberal amounts of phase distortion because bit cell definition is, compared to the previously known systems, relatively unimportant.

The digital data recovery system of this disclosure has been developed to meet the need to inexpensively and reliably extract data from a Manchester encoded stream that typically exists between a cluster controller and peripherals, that is, terminals, printers, multiplexers, etc.

Manchester encoding is a protocol in which each bit, or bits cell, exhibits a self clocking property. The transmitter clock is related to the transition, that is, the rising or falling edge, in the center of each bit cell. At "1" is defined by a rising edge in the center of the bit cell and "0" is defined by a falling edge in the center of the bit cell.

The system of this disclosure is for deriving digital data from a bi phase encoded data stream wherein signal transition occurs at mid-bit or bit boundaries, the derived digital data being represented by 1's or 0's, includes an edge detector for detecting the occurrence of each failing edge of the data stream. An edge decoder is connected to an edge detector for determining the time between the successive failing edges, as well as qualifying failing edges.

A falling edge identifier is connected to the edge decoder for determining whether a detected falling edge occurs on a bit boundary (BB) or at mid-bit (MB).

A falling edge memory is connected to the falling edge identifier for remembering whether the previous falling edge occurred at BB or MD.

A data decoder is connected to receive input from the falling edge memory and the edge decoder. The data decoder has logic for determining the recovered data for passage out as decoded data, that is, as 1's and 0's, according to a table. There is further logic which implements a data strobe, indicating valid recovered data from the data decoder to any external circuits.

Thus, the system herein provides an improved system including improved algorithms for recovering digital bi phase data from a Manchester format data stream that is relatively inexpensive to produce in that it has relatively simple and inexpensive solid state components. Further, the system of this disclosure has increased quality and reliability and is relatively insensitive to phase distortion.

A better understanding of the invention will be had by reference to the following description and claims, taken in conjunction with the attached drawings.

DESCRIPTION OF THE DRAWINGS

FIG. 1 shows a short section of a portion of a bi phase data stream moving from left to right and showing a bi phase "1".

FIG. 2 is a diagram like FIG. 1 but showing a short portion of a digital data stream flowing from left to right and showing a falling edge at mid-bit, indicating an "0".

FIG. 3 is a voltage diagram as in FIGS. 1 and 2 but showing the signal as moving from left to right passing through a sequence of eight bits, the bi phase bit value being indicated as "0's" and "1's" below each mid-bit transition.

FIG. 5 is a rudimentary block diagram of basic circuitry for practicing the system of this invention utilizing the algorithms herein described and utilizing state machine components.

DESCRIPTION OF THE PREFERRED EMBODIMENT

Figure 4:
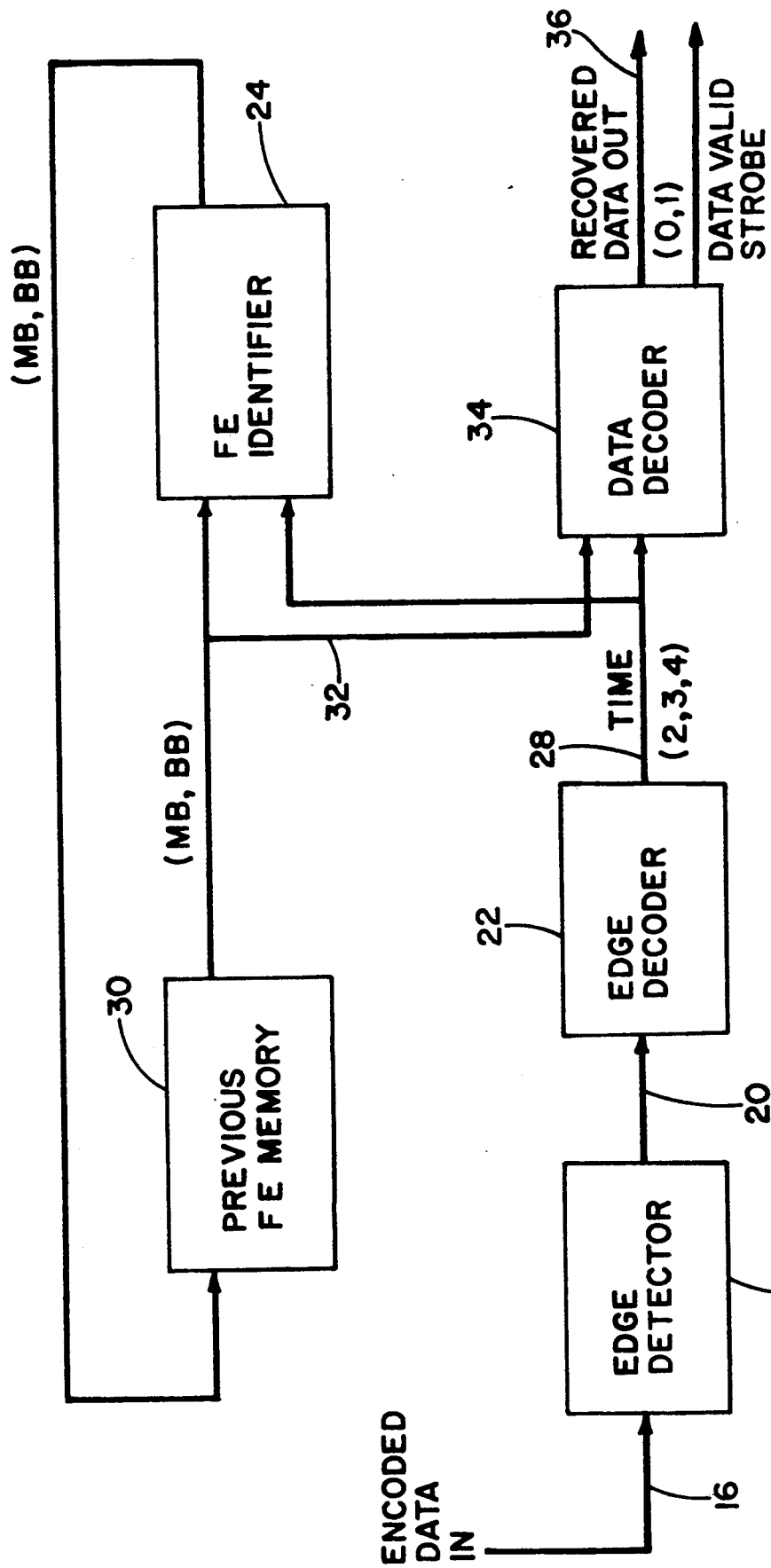
FIG. 4 is a rudimentary block diagram of basic circuitry for practicing the system of this invention and utilizing algorithms herein described for extracting data from a bi phase data stream.

Referring to FIG. 1, the voltage level of a signal is indicated by the numeral 10 with time as the abscissa and voltage as the ordinate in the graph, time flowing from left to right, and showing bit boundaries 12 at each end of a time length designating a bit time. In the code format the voltage level of data stream 10 has made a transition from low to high at a point intermediate mid-boundaries 12, which is called a "mid-bit position" or "mid-bit boundary" 14. A bit cell is defined as the signal from bit boundary to a mid-bit boundary or from a mid-bit boundary to a bit boundary.

The system of this invention provides means of data recovery from a Manchester encoded signal such as represented by FIG. 3 which can, in the actual practice of the invention, employ state machines in series with a falling edge detection circuit. This may consist of an edge detector, an edge encoder and a data recovery state machine. The system operates as follows: Once the edge decoder 22 receives falling edge detected 20 from edge detector 18, a time measurement is made until the next falling edge. The time is then decoded into "2", "3" or "4" bit cells when that edge occurs. The data recovery state machine 38 then uses this information to indicate recovered data out qualified with a data strobe, as well as determining if the FE occured on a bit-boundary or a mid-bit boundary.

Thus, FIG. 3 shows the Manchester encoding of "01001110".

FIG. 2 is a continuation of the concept of FIG. 1 showing voltage level 10 of a bit cell between bit boundaries 12 and wherein, at the mid-bit location or mid-bit boundary, voltage 10 has gone from high to low, indicating a digital "0".

FIG. 3 shows a typical Manchester encoded data stream passing through sixteen cells and showing transitions that occur both on the bit boundaries and at mid-bit locations, showing that as each falling edge occurs at a mid-bit location a digital "0" is indicated and a rising level at the mid-bit location indicates "1". A transition at a bit-boundary, whether either high to low or low to high, is not indicative of a digital "1" or "0".

Thus, the circuit has a two fold function. First, to accurately recover each bit in a transmission, and second to interpret a coax protocol correctly.

As an example of the method of practicing this invention, FIG. 4 is a diagram including portions of the state machines and is illustrated merely as one example of a circuit for practicing the invention. The inbound encoded data in a data stream appears at 16. An edge detector 18 detects falling edges in the input encoded data stream and provides a signal at 20 to update the other portions of the circuit when a falling edge is detected. The output at 20 is fed to an edge decoder 22 that determines the time between successive falling edges. This determined time is conveyed simultaneously to a falling edge identifier 24 and to a data decoder circuit 34, the output of the edge decoder appearing at 28.

The falling edge identifier circuit 24 determines whether the current falling edge occurred on a bit boundary (BB) or at mid-bit, which may be termed at a mid-bit boundary (MB). The rules for making this decision are based on a falling edge (FE) placement table as following:

|  |  | Previous Falling Edge | |
|---|---|---|---|
|  |  | MB | BB |
| Bit Cells Between Falling Edges | 2 | MB | BB |
|  | 3 | BB | MB |
|  | 4 | MB | X |

This table can be readily implemented in combinatorial logic. Note that entry "X" in the table is a don't care condition even though it is a protocol violation.

It can further be seen that the decision of the falling edge identifier 24 is based partially upon information from the previous falling edge and for this purpose, a previous falling edge memory 30 is required. This information is then fed by conductor 32 to a data decoder 34.

The function of data decoder 34 is to determine whether or not the current decoded data is a "1" bit or a "0" bit or a double bit pattern "10", or is invalid. The rules for making this determination are in the form of a lookup table as follows:

|  |  | Previous Falling Edge Memory | |
|---|---|---|---|
|  |  | MB | BB |
| Bits Cells Between Falling Edges | 2 | 0 | 1 |
|  | 3 | 1 | 10 |
|  | 4 | 10 | invalid |

This table can be implemented in one synchronous module modeled as a state machine. This state machine would strobe valid data out and treat any protocol violation as an end of transmission.

From the recovered data table, as an example, if the current received falling edge has been determined by the previous edge memory 30 to be a mid-bit falling edge and if the time elapse since the preceding falling edge is "1" bit cell in length then the bit data is a "0". If the time lapsed is 1½ bit cells the date decoder 34 determines that the data is a "1". As another example, if the previous falling edge 30 determines that the current falling edge is at a bit boundary and edge decoder 22 determines that the time lapse between falling edges is of 1½ bit cell duration, then data decoder 34 determines that the data is a double bit pattern "10". The decoded data appears at output 36.

Thus, the data recovery system of this disclosure derives the data by analyzing the bit stream and detecting the occurrence of falling edges in the bit stream. Rising edges are ignored. From a first algorithm the falling edges are determined to be at bit boundary or mid-bit locations and from another algorithm the spacing between the present and preceding falling bit in terms of bit cells is then applied to determine whether the data is a "1", "0", "10" or invalid and such data is then fed out of the decoder, such as from a control unit to a peripheral device or devices.

Whereas FIG. 4 shows an embodiment for practicing the invention utilizing modules, FIG. 5 illustrates the method of practicing the invention using state machines. In FIG. 5 the steps of determining FE placement utilizing the FE placement algorithm or lookup table and the step of determination of recovered data utilizing the recovered data algorithm or lookup table, as previously described, are encompassed in a data recovery state machine 38. This provides the decoded data out at 36 and, in addition, provide a clock signal at 40. The basic circuity arrangement of FIG. 5 is representative of the means of actual practicing of the invention, whereas FIG. 4 is indicative of the circuitry concept primarily for purpose of better illustrating the invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A data recovery system for deriving digital data from a bi phase encoded data stream wherein signal transition occurs at mid-bit or bit boundaries, the derived digital data being represented as a 1 or 0, comprising:

edge detector means for detecting the occurrence of each falling edge of the data stream;

edge decoder means connected to said edge detector means for determining the time between successive falling edges;

falling edge identifier means connected to said edge decoder for determining whether a detected falling edge occurred on a bit boundary (BB) or at mid-bit (MB) according to the table

|  |  | MB | BB |
|---|---|---|---|
| Bit Cells Between Falling Edges | 2 | MB | BB |
|  | 3 | BB | MB |
|  | 4 | MB | X | falling edge memory means connected to said falling edge identifier for remembering whether the previous falling edge occurred at BB or MB;

a data decoder connected to receive input from said falling edge memory means and said edge decoder, the data decoder having means for determining the recovered data for passage out as decoded data according to the table

|  |  | Previous Falling Edge | |
|---|---|---|---|
|  |  | MB | BB |
| Bit Cells Between Falling Edges | 2 | 0 | 1 |
|  | 3 | 1 | 10 |
|  | 4 | 10 | Invalid |

* * * * *